(12) United States Patent
Myers et al.

(10) Patent No.: US 8,404,115 B2
(45) Date of Patent: Mar. 26, 2013

(54) SEALED FILTER ELEMENT

(75) Inventors: Clint A. Myers, Stoughton, WI (US);
Daniel R. Cady, Vancouver, WA (US);
Mark A. Herioux, Stoughton, WI (US);
John W. Wacker, Evansville, WI (US);
Scott W. Schwartz, Cottage Grove, WI (US); Benjamin J. Rubenzer, Bloomer, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 837 days.

(21) Appl. No.: 12/505,715

(22) Filed: Jul. 20, 2009

(65) Prior Publication Data
US 2011/0011782 A1 Jan. 20, 2011

(51) Int. Cl.
*B01D 35/30* (2006.01)

(52) U.S. Cl. ...................................................... 210/232

(58) Field of Classification Search .................. 210/232, 210/237, 238, 455, 459, 470, 473, 477, 479–481, 210/493.1, 493.2, 493.3, 136, 444, 435, 445, 210/451, 453, 495, 493.5; 55/494, 497, 502, 55/511, 514, 383.3, 521, 504, 383.5, 503, 55/DIG. 31
See application file for complete search history.

(56) References Cited

U.S. PATENT DOCUMENTS

| | | | | |
|---|---|---|---|---|
| 4,444,575 | A | * | 4/1984 | Miller et al. .................... 96/132 |
| 6,375,700 | B1 | | 4/2002 | Jaroszczyk et al. |
| 6,416,561 | B1 | | 7/2002 | Kallsen et al. |
| 6,478,018 | B2 | | 11/2002 | Fedorowicz et al. |
| 6,482,247 | B2 | | 11/2002 | Jaroszczyk et al. |
| 6,490,754 | B1 | * | 12/2002 | Spaulding ..................... 15/323 |
| 6,641,637 | B2 | | 11/2003 | Kallsen et al. |
| 7,070,641 | B1 | * | 7/2006 | Gunderson et al. ............ 55/497 |
| 7,247,183 | B2 | | 7/2007 | Connor et al. |
| 7,323,106 | B2 | | 1/2008 | Jaroszczyk et al. |
| 2003/0177745 | A1 | * | 9/2003 | Jauw ............................. 55/497 |
| 2005/0072309 | A1 | * | 4/2005 | Mullaney ...................... 99/330 |
| 2006/0101795 | A1 | | 5/2006 | Krisko et al. |
| 2006/0118661 | A1 | * | 6/2006 | Hartle et al. .................. 239/691 |
| 2007/0175187 | A1 | | 8/2007 | Kopec et al. |
| 2008/0066434 | A1 | * | 3/2008 | Kuempel et al. ............... 55/357 |
| 2008/0264008 | A1 | * | 10/2008 | Xu et al. ....................... 55/333 |

\* cited by examiner

*Primary Examiner* — Ling Choi
*Assistant Examiner* — Catherine S Branch
(74) *Attorney, Agent, or Firm* — Andrus, Sceales, Starke & Sawall, LLP (57) ABSTRACT

A filter element has filter media supported by a filter frame having differential channel depth receiving initially flowable sealing material. The filter frame has a widened mouth for receiving and funneling sealing material. A filter frame is provided with leading and trailing edge construction ensuring proper installation orientation. A filter frame is provided with removal assist construction for service personnel.

10 Claims, 6 Drawing Sheets

SEALED FILTER ELEMENT

BACKGROUND AND SUMMARY

The invention relates to filter elements and improved sealing therefor.

A filter element includes filter media for passing fluid flow therethrough from an upstream side to a downstream side. A filter frame typically circumscribes the filter media for supporting the filter media in a housing. Sealing material is provided between the filter media and the filter frame and provides a seal therebetween blocking bypass of fluid, including contaminates, around the filter media from the upstream side to the downstream side. The filter frame is sealed to the housing, e.g. by a gasket, to also block bypass flow in the housing.

The present invention arose during continuing development efforts directed toward filter element sealing technology.

DETAILED DESCRIPTION

Figure 1:
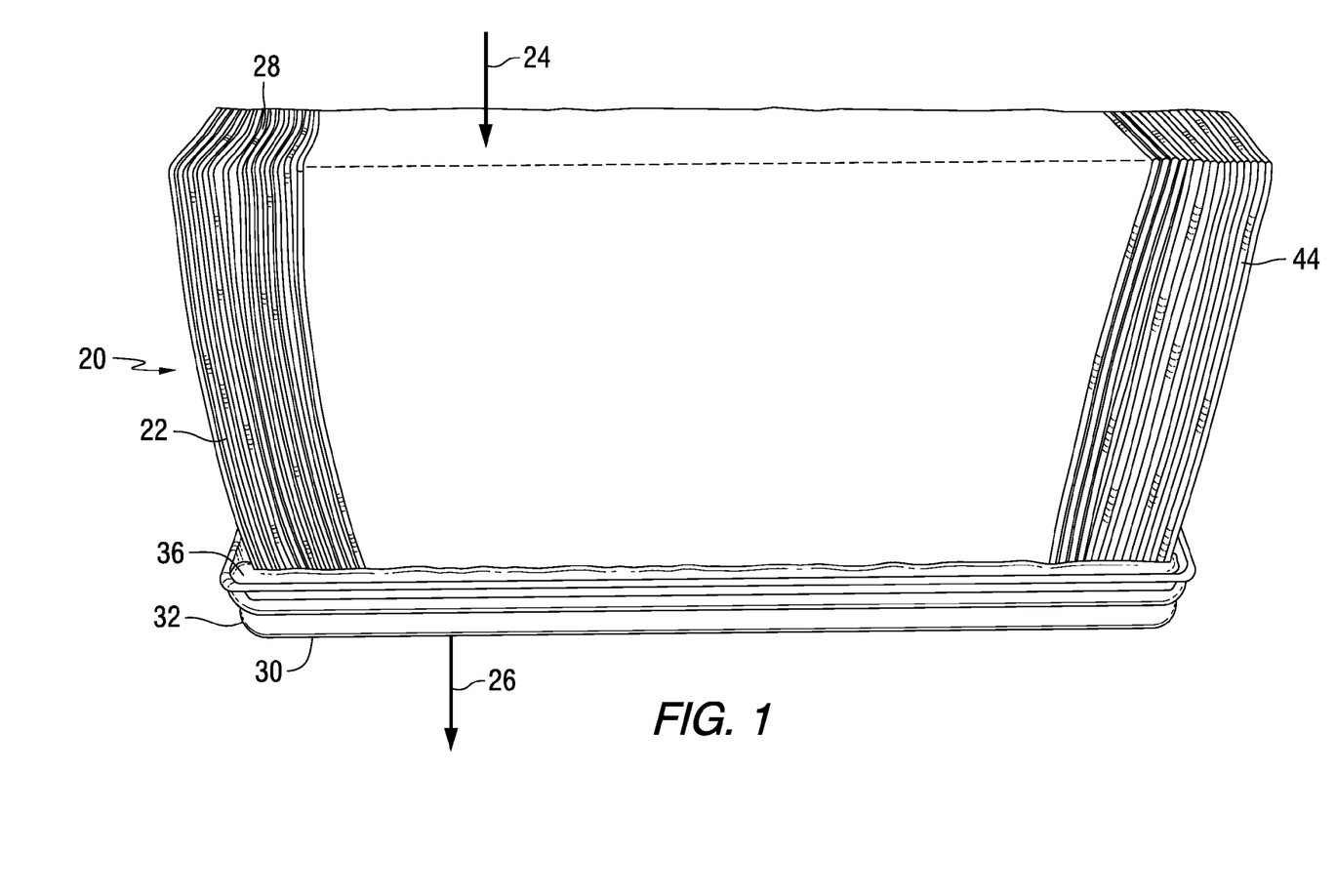
FIG. 1 is a perspective view of a filter element constructed in accordance with the invention.
Figure 2:
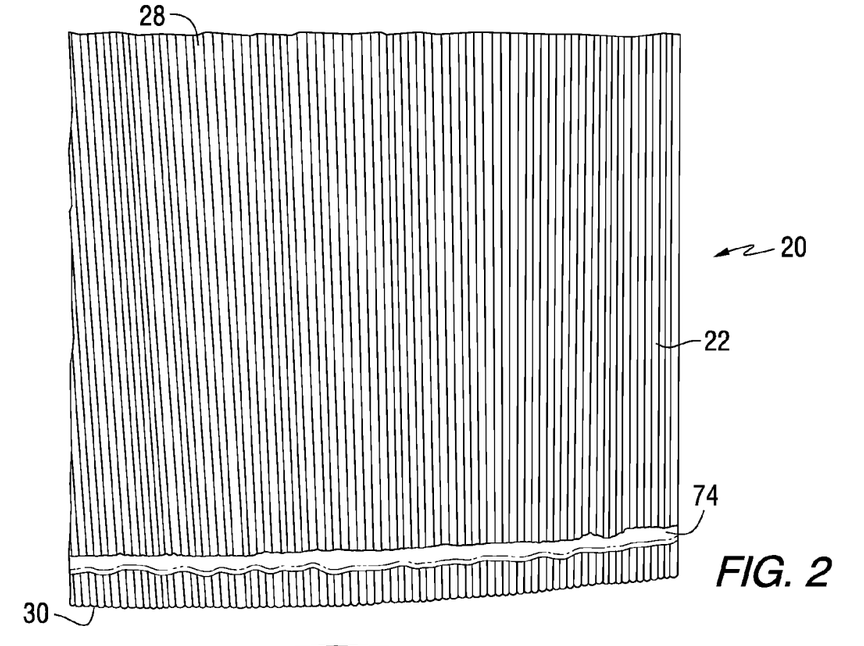
FIG. 2 is a view of the filter media of FIG. 1 prior to insertion into the filter frame.
Figure 3:
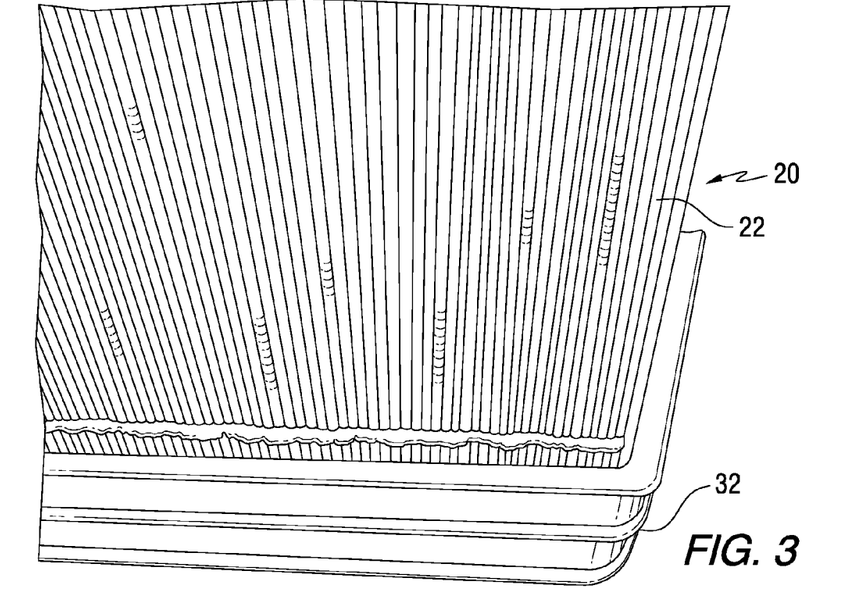
FIG. 3 is a perspective view of the filter media of FIGS. 1 and 2 during insertion into the filter frame.

FIGS. 1-3 show a filter element 20 including filter media 22 for passing fluid (e.g. air, liquid, or other fluid) flow therethrough as shown at arrows 24, 26, from an upstream side 28 to a downstream side 30. A filter frame 32 circumscribes filter media 22 for supporting the filter media in a housing such as 34, FIG. 7. Sealing material 36 between filter media 22 and filter frame 32 provides a seal therebetween blocking bypass of fluid around the filter media from the upstream side to the downstream side, all as is known.

Figure 4:
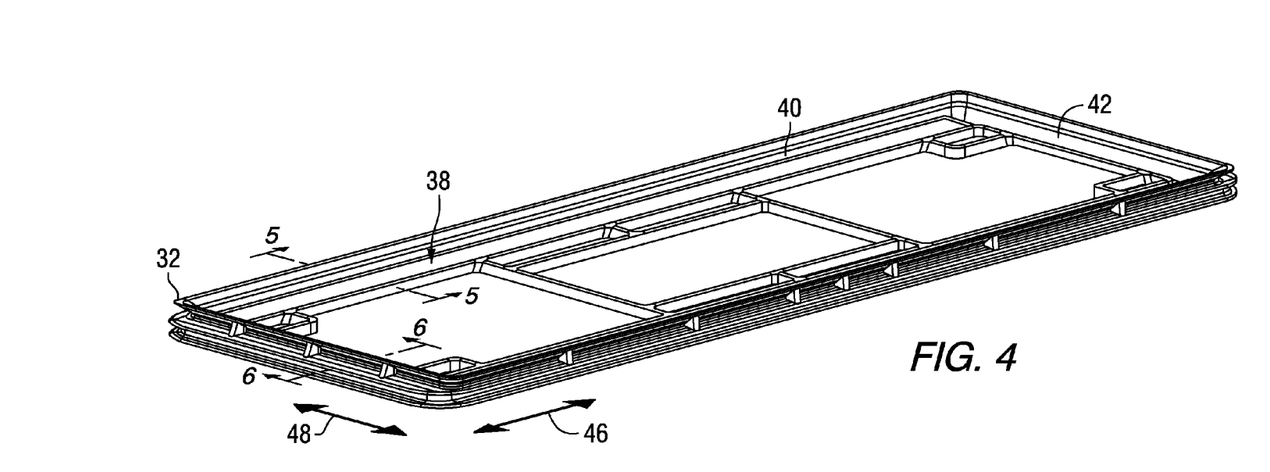
FIG. 4 is a perspective view of a filter frame.
Figure 5:
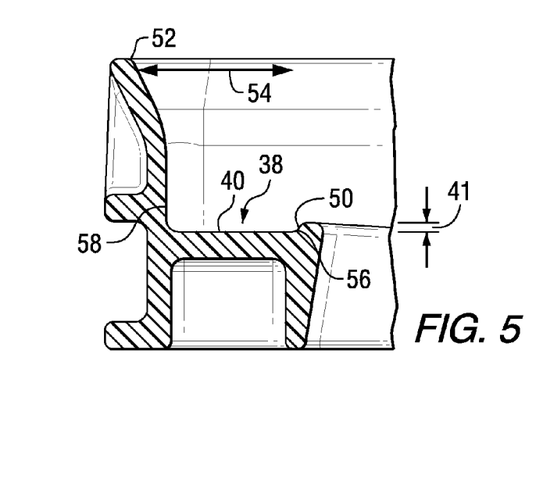
FIG. 5 is a sectional view taken along line 5-5 of FIG. 4.
Figure 6:
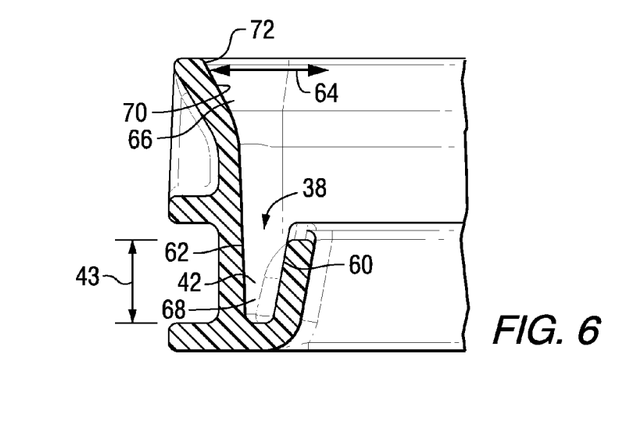
FIG. 6 is a sectional view taken along line 6-6 of FIG. 4.

Filter frame 32, FIGS. 4-6, has a channel 38 receiving the sealing material therein in initially flowable form flowing into contact with filter media 22 and filter frame 32 and forming seal 36 therebetween. Examples of sealing material include foamed hot melt, as known in the art, which may include polymers including polyamide, polyester, polyurethane. The sealing material is introduced by pouring or the like into channel 38, and then solidifies to form a seal. Channel 38 has a first depth channel section 40, FIGS. 4, 5, of a first channel depth receiving the sealing material, and a second channel section 42, FIGS. 4, 6, of a second channel depth receiving the sealing material. The noted second channel depth, FIG. 6, is greater than the noted first channel depth, FIG. 5.

Fluid flow through filter media 22 is along an axial flow direction, arrows 24, 26. Filter frame 32 extends laterally along a lateral direction relative to the noted axial direction and circumscribes the filter media. Each of the noted first and second channel depths extends axially. Second channel section 42, FIG. 6, has a greater axial depth than first channel section 40, FIG. 5. In one embodiment, filter media 22 is pleated filter media pleated along a plurality of axially extending bend lines 44. As shown in U.S. Pat. No. 6,375,700, incorporated herein by reference, the filter media has a plurality of wall segments extending in serpentine manner between the bend lines, the wall segments extending axially between upstream and downstream ends 28 and 30, the wall segments defining axial flow channels therebetween, the upstream ends of the wall segments being alternately sealed to each other to define a first set of flow channels having open upstream ends, and a second set of flow channels interdigitated with the first set of flow channels and having closed upstream ends, the downstream ends of the wall segments being alternately sealed to each other such that the first set of flow channels have closed downstream ends, and the second set of flow channels have open downstream ends, such that fluid to be filtered flows substantially directly axially, 24, 26, through the filter media, through the open upstream ends of the first set of flow channels then through the wall segments then through the open downstream ends of the second set of flow channels. First channel section 40 spans along a first lateral direction 46, FIG. 4, across a plurality of the noted axially extending bend lines 44 of the pleats at one of the upstream and downstream ends, e.g. at downstream end 30. Second channel section 42 spans along a second lateral direction 48, FIG. 4, along a given wall segment at the noted one of the upstream and downstream ends, e.g. downstream end 30. First channel section 40 along the noted first channel depth extends axially beyond the downstream end of the pleated filter media to a first axial extension 41 therebeyond. Second channel section 42 along the noted second channel depth extends axially beyond the downstream end of the pleated filter media to a second axial extension 43 therebeyond. The noted second axial extension 43 of the second channel section 42, FIG. 6, is longer than the noted first axial extension 41 of the first channel section 40, FIG. 5.

Channel 38, FIGS. 4-6, has an inner perimeter 50 and an outer perimeter 52. Outer perimeter 52 is transversely spaced outwardly of inner perimeter 50 by a transverse gap 54 therebetween. Transverse gap 54 receives the sealing material in its initially flowable form. First channel section 40 has first and second walls 56 and 58 spaced along transverse direction 48 by transverse width 54 therebetween. Second channel section 42 has third and fourth walls 60 and 62 transversely spaced along transverse direction 46 by transverse width 64 therebetween. Transverse width 64 is less than transverse width 54. First channel section 40 has a lesser axial depth and a greater transverse width than the axial depth and transverse width of second channel section 42.

Channel 38 has an entry section 66, FIG. 6, and a depth section 68. Entry section 66 includes sidewall 62 extending from depth section 68. Sidewall 62 has a guide surface 70 extending along a diverging taper providing a widened mouth 72 for initially receiving the sealing material in flowable form and funneling the sealing material to depth section 68. Depth section 68 extends axially downwardly. Guide surface 70 of sidewall 62 extends obliquely along an oblique direction relative to the noted axial direction. Depth section 68 has the noted sidewalls 62 and 60 transversely spaced by a transverse gap therebetween. Wall 62 has a greater axial height than wall 60. The top of wall 62 extends axially upwardly beyond the top of wall 60. Guide surface 70 extends upwardly and obliquely from the top of wall 62. Channel 38 has the noted first channel section 40 of a first channel depth receiving the sealing material, and the noted second channel section 42 of a second channel depth receiving the sealing material, the second channel depth being greater than the first channel depth, each of the first and second channel depths extending axially, and the second channel section 42 having a greater axial depth than the first channel section 40. In some embodiments, filter media 22 has a seal bead 74, FIG. 2, formed therealong extending transversely across the noted pleat bend lines, as is known. The seal bead is formed along the filter media prior to insertion of the filter media into filter frame 32. Upon insertion of filter media 22 into filter frame 32, the seal bead 74 extends laterally along the filter media proximate channel 38. Upon pouring of the flowable sealing material into the filter frame, such sealing material, as it solidifies, bonds with seal bead 74.

Figure 7:
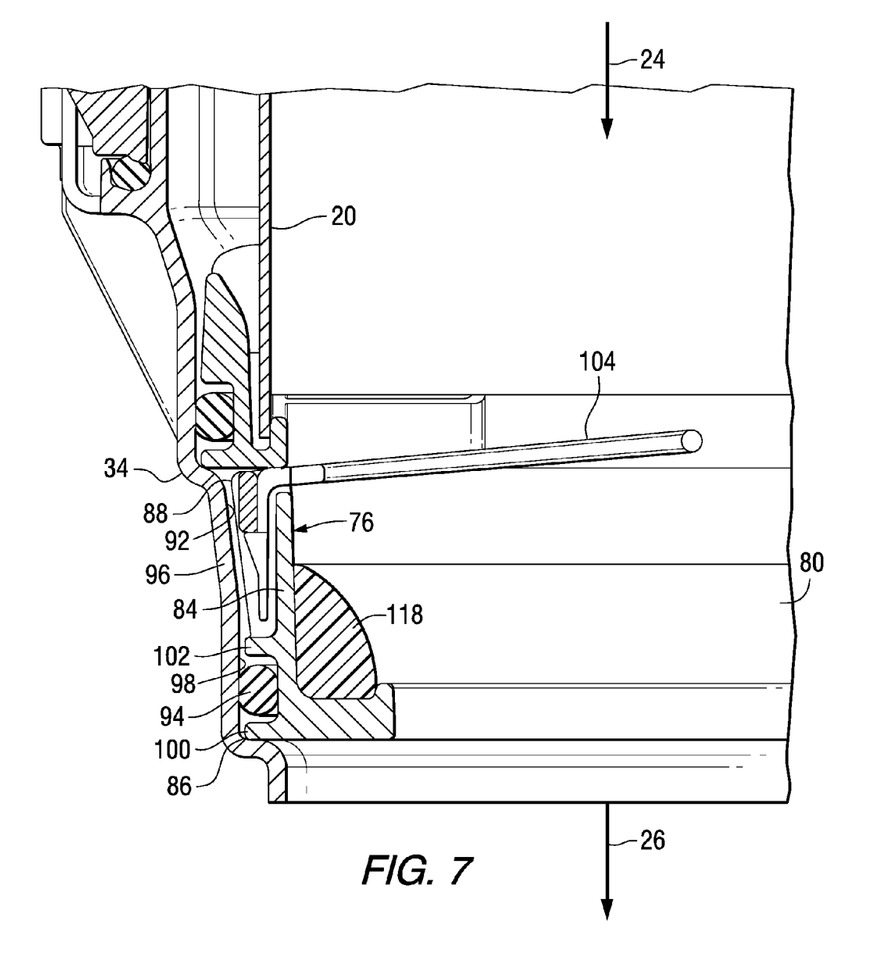
FIG. 7 is a sectional view of a portion of first and second filter elements in a housing.
Figure 8:
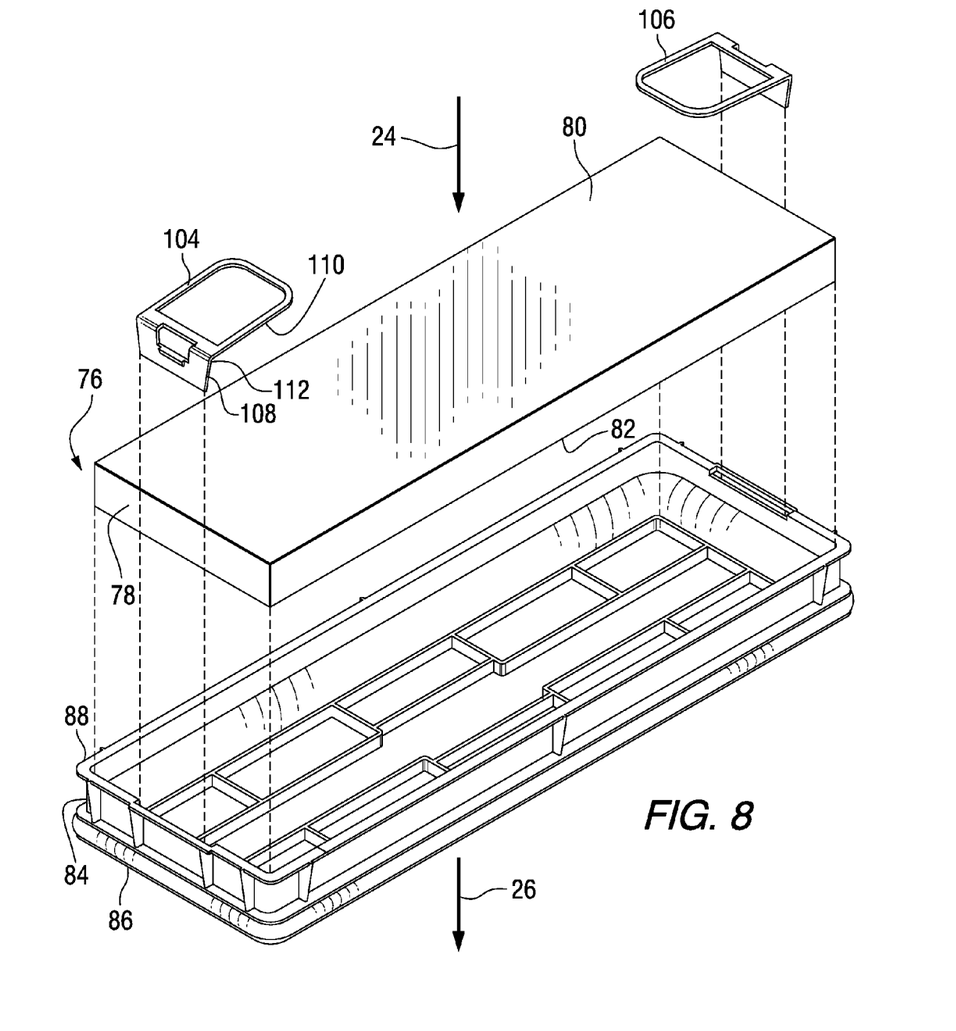
FIG. 8 is an exploded perspective view of the lower filter element of FIG. 7.

FIG. 7 shows filter element 20 in housing 34, and a second filter element 76 in the housing downstream of first filter element 20. In one embodiment, first filter element 20 is a primary or main filter element, and filter element 76 is a secondary or safety filter element. Filter element 76 includes filter media 78, FIG. 8, which may be pleated filter media, foam material, or any other filter media, for passing fluid flow therethrough as shown at arrows 24, 26 from an upstream side 80 to a downstream side 82. A filter frame 84 circumscribes filter media 78 for supporting the filter media in a housing such as 34. Filter frame 84 is axially insertable into the housing, e.g. axially downwardly in FIG. 7. Filter frame 84 has a leading edge 86 and a trailing edge 88 which are laterally offset from one another, for example as shown at lateral offset 90 in FIG. 10, such that filter frame 84 can be fully axially inserted into housing 34 only with leading edge 86 first, to ensure proper installation orientation of filter frame 84, and prevent unintended reverse orientation of filter frame 84 in housing 34. The noted lateral offset coordinates with housing sidewall tapered ramp surface 92 to provide the noted installation integrity and one-way-only fit for proper orientation. Trailing edge 88 of filter frame 84 is transversely outward of leading edge 86 of the filter frame relative to filter media 80.

Figure 9:
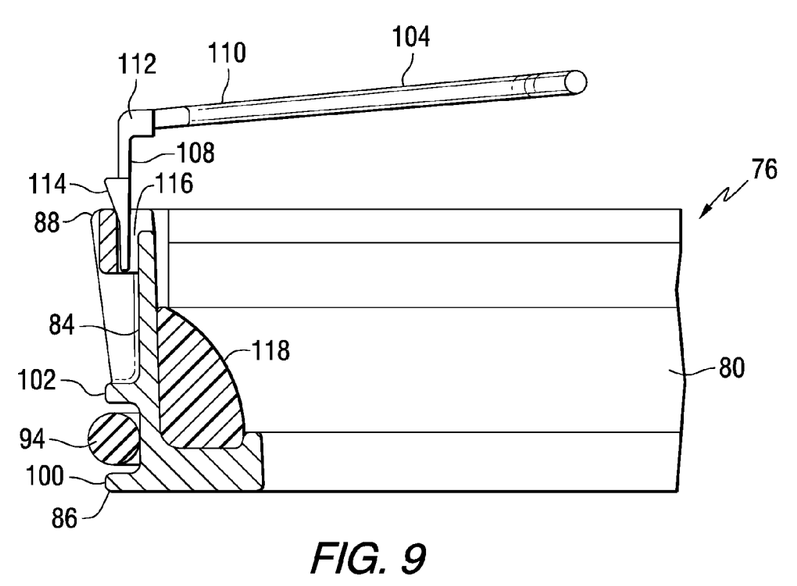
FIG. 9 is a sectional view of a portion of FIG. 7 illustrating insertion of a pull tab.
Figure 10:
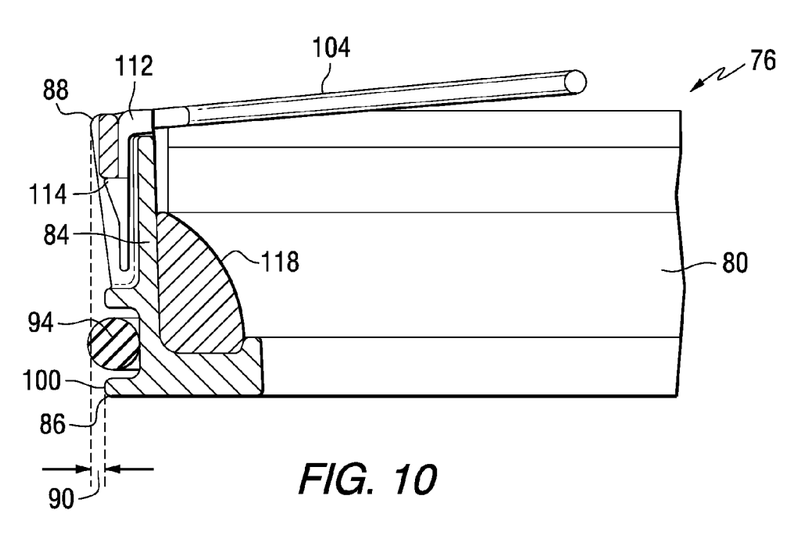
FIG. 10 is like FIG. 9 and shows the construction after insertion of the pull tab.

Filter frame 84, FIGS. 7, 9, 10, has a resiliently compressible seal 94, e.g. an elastomeric seal, e.g. an O-ring, at leading edge 86. Housing 34 has an axially extending sidewall 96 which is laterally outward of filter frame 84. Sidewall 96 has tapered ramp surface 92 extending axially and inwardly towards a sealing surface 98 which extends axially downwardly therefrom. Seal 94 has an uncompressed state, FIGS. 9, 10, upon introduction into housing 34 at ramp surface 92 of sidewall 96. Seal 94 has a compressed state, FIG. 7, engaging sealing surface 98 of sidewall 96 upon axial insertion of filter frame 84 into housing 34 in the noted proper installation orientation. Filter frame 84 has first and second axially spaced shoulders 100 and 102 defining an axial gap therebetween receiving seal 94.

Filter frame 84, FIGS. 7-10, is axially insertable into housing 34 with leading edge 86 first. Trailing edge 88 has at least one and preferably two pull tabs 104, 106, FIG. 8, for assisting removal of filter element 76 from housing 34 upon gripping of the pull tab by service personnel. Pull tabs 104, 106 are snap-fit mounted to trailing edge 88 of filter frame 84. Each pull tab is an L-shaped member having first and second legs, e.g. legs 108, 110 meeting at a junction 112 at trailing edge 88. Leg 108 extends axially from junction 112 toward leading edge 86. Leg 110 extends laterally from junction 112 and into the path of fluid flow through filter media 80. Leg 108 has an angled snap-fit barb 114 which is pushed axially downwardly through slot or opening 116 of the filter frame, FIG. 9, to lock the pull tab in place, FIG. 10. Filter media 80 is secured in filter frame 84 in any known manner, e.g. by adhesive at 118. In one preferred embodiment, the adhesive is polyamide hotmelt bonding with the filter frame, including a plastic frame. Alternatively, the sealing techniques described above for filter element 20 may be used for filter element 76.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter element comprising filter media for passing fluid flow therethrough from an upstream side to a downstream side, a filter frame circumscribing said filter media along a perimeter of said filter media for supporting said filter media in a housing, sealing material between said filter media and said filter frame and providing a seal therebetween blocking bypass of fluid around said filter media from said upstream side to said downstream side, said filter frame having a channel receiving said sealing material therein in initially flowable form flowing into contact with said filter media and said filter frame and forming said seal therebetween, said channel having a first channel section of a first channel depth receiving said sealing material, and a second channel section of a second channel depth receiving said sealing material, said second channel depth being greater than said first channel depth, said first channel section extending perimeterally along a first section of said perimeter, said second channel section extending perimeterally along a second section of said perimeter different than said first section of said perimeter, such that said filter frame has differential channel depth along the perimeteral extension of said filter frame provided by said first and second channel sections extending perimeterally along said first and second different sections of said perimeter.

2. The filter element according to claim 1 wherein said fluid flow through said filter media is along an axial flow direction, said filter frame extends laterally along a lateral direction relative to said axial direction and circumscribes said filter media, each of said first and second channel depths extends axially, and said second channel section has a greater axial depth at said second section of said perimeter than said first channel section at said first section of said perimeter.

3. The filter element according to claim 2 wherein said filter media is pleated filter media pleated along a plurality of axially extending bend lines, said filter media having a plurality of wall segments extending in serpentine manner between said bend lines, said wall segments extending axially between upstream and downstream ends, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter media, through said open upstream ends of said first set of flow channels then through said wall segments then through said open downstream ends of said second set of flow channels, and wherein said first channel section spans laterally and perimeterally along said first section of said perimeter along a first lateral direction across a plurality of said axially extending bend lines of said pleats at one of said upstream and downstream ends, and said second channel section spans laterally and perimeterally along said second section of said perimeter along a second lateral direction along and parallel to a given said wall segment at said one of said upstream and downstream ends.

4. The filter element according to claim 3 wherein said first channel section along said first channel depth extends axially beyond said one of said upstream and downstream ends to a first axial extension beyond said one of said upstream and downstream ends, and said second channel section along said second channel depth extends axially beyond said one of said upstream and downstream ends to a second axial extension beyond said one of said upstream and downstream ends, said second axial extension being longer than said first axial extension.

5. The filter element according to claim 2 wherein said channel has an inner perimeter frame wall and an outer perimeter frame wall, said outer perimeter frame wall is transversely spaced outwardly of said inner perimeter frame wall by a transverse gap therebetween, said transverse gap receives said sealing material.

6. The filter element according to claim 5 wherein said first channel section has first and second walls transversely spaced along a first transverse direction by a first transverse width therebetween, said second channel section has third and fourth walls transversely spaced along a second transverse direction by a second transverse width therebetween, said second transverse width being less than said first transverse width, such that said first channel section has a lesser axial depth and a greater transverse width than the axial depth and transverse width of said second channel section.

7. A filter element comprising filter media for passing fluid flow therethrough from an upstream side to a downstream side, a filter frame circumscribing said filter media for supporting said filter media in a housing, sealing material between said filter media and said filter frame and providing a seal therebetween blocking bypass of fluid around said filter media from said upstream side to said downstream side said filter frame having a channel receiving said sealing material therein in initially flowable form flowing into contact with said filter media and said filter frame and forming said seal therebetween, said channel having an entry section and a depth section said entry section comprising a sidewall extending from said depth section, said sidewall having a guide surface extending along a diverging taper providing a widened mouth for initially receiving said sealing material in flowable form and funneling said sealing material to said depth section, wherein said fluid flow through said filter media is along an axial flow direction, said filter frame extends laterally along a lateral direction relative to said axial direction and circumscribes said filter media, said depth section extends axially, and said guide surface of said sidewall extends obliquely along an oblique direction relative to said axial direction, wherein said depth section has first and second walls transversely spaced by a transverse gap therebetween, and said first wall has a greater axial height than said second wall, wherein the top of said first wall extends axially upwardly beyond the top of said second wall, and said guide surface of said sidewall of said entry section extends upwardly and obliquely from said top of said first wall, wherein said filter frame circumscribes said filter media along a perimeter of said filter media, said channel has a first channel section of a first channel depth receiving said sealing material, and a second channel section of a second channel depth receiving said sealing material, said second channel depth being greater than said first channel depth, each of said first and second channel depths extends axially, and said second channel section has a greater axial depth than said first channel section, wherein said first channel section extends perimeterally along a first section of said perimeter, said second channel section extends perimeterally along a second section of said perimeter different than said first section of said perimeter, such that said filter frame has differential channel depth along the perimeteral extension of said filter frame provided by said first and second channel sections extending perimeterally along said first and second different sections of said perimeter.

8. The filter element according to claim 7 wherein said filter media is pleated filter media pleated along a plurality of axially extending bend lines, said filter media having a plurality of wall segments extending in serpentine manner between said bend lines, said wall segments extending axially between upstream and downstream ends, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter media, through said open upstream ends of said first set of flow channels then through said wall segments then through said open downstream ends of said second set of flow channels, and wherein said first channel section spans laterally and perimeterally along said first section of said perimeter along a first lateral direction across of a plurality of said axially extending bend lines of said pleats at one of said upstream and downstream ends, and said second channel section spans laterally and perimeterally along said second section of said perimeter along a second lateral direction along and parallel to a given said wall segment at said one of said upstream and downstream ends, said first channel section along said first channel depth extends axially beyond said one of said upstream and downstream ends to a first axial extension beyond said one of said upstream and downstream ends, and said second channel section along said second channel depth extends axially beyond said one of said upstream and downstream ends to a second axial extension beyond said one of said upstream and downstream ends, said second axial extension being longer than said first axial extension.

9. A filter element comprising filter media for passing fluid flow therethrough from an upstream side to a downstream side, a filter frame circumscribing said filter media for supporting said filter media in a housing, said filter frame being axially insertable into said housing, said filter frame having a leading edge and a trailing edge which are laterally offset from one another such that said filter frame can be fully axially inserted into said housing only with said leading edge first, to ensure proper installation orientation of said filter frame, and prevent unintended reverse orientation of said filter frame in said housing, wherein said filter frame has a resiliently compressible seal at said leading edge, said housing has an axially extending sidewall which is laterally outward of said filter frame, said sidewall having a tapered ramp surface extending axially and inwardly towards a sealing surface which extends axially therefrom, said seal having an uncompressed state upon introduction into said housing at said ramp surface of said sidewall, said seal having a compressed state engaging said sealing surface of said sidewall upon axial insertion of said filter frame into said housing in said proper installation orientation, wherein said filter frame has first and second axially spaced shoulders defining an axial gap therebetween receiving said seal.

10. A filter assembly comprising:
   a housing;
   a first filter element comprising first filter media for passing fluid flow therethrough from an upstream side to a downstream side, a first filter frame circumscribing said first filter media for supporting said first filter media in said housing, sealing material between said first filter media along a perimeter of said filter media and said first filter frame and providing a seal therebetween blocking bypass of said fluid around said first filter media from said upstream side to said downstream side, said first filter frame having a channel receiving said sealing material therein in initially flowable form flowing into contact with said first filter media and said first filter frame and forming said seal therebetween, said first filter frame satisfying at least one of the following two conditions:
   said channel having a first channel section of a first channel depth receiving said sealing material, and a second channel section of a second channel depth receiving said sealing material, said second channel depth being greater than said first channel depth, said first channel section extending perimeterally along a first section of said perimeter, said second channel section extending perimeterally along a second section of said perimeter different than said first section of said perimeter, such that said filter frame has differential channel depth along the perimeteral extension of said filter frame provided by said first and second channel sections extending perimeterally along said first and second different sections of said perimeter;
   said channel having an entry section and a depth section, said entry section comprising a sidewall extending from said depth section, said sidewall having a guide surface extending along a diverging taper providing a widened mouth for initially receiving said sealing material in flowable form and funneling said sealing material to said depth section;
   a second filter element in said housing downstream of said first filter element and comprising second filter media for passing fluid flow therethrough from an upstream side to a downstream side, a second filter frame circumscribing said second filter media for supporting said second filter media in said housing, said second filter frame being axially insertable into said housing, said second filter frame having a leading edge and a trailing edge, said second filter element satisfying at least one of the following two conditions:
   said leading edge and said trailing edge are laterally offset from one another such that said second filter frame can be fully axially inserted into said housing only with said leading edge first, to ensure proper installation orientation of said second filter frame, and prevent unintended reverse orientation of said second filter frame in said housing;
   said second filter frame is axially insertable into said housing with said leading edge first, said trailing edge having at least one pull tab for assisting removal of said second filter element from said housing upon gripping of said pull tab by service personnel.

* * * * *